(12) United States Patent
Jepperson et al.

(10) Patent No.: US 11,620,770 B1
(45) Date of Patent: Apr. 4, 2023

(54) OBJECT ORIENTED SCREEN OVERLAY

(71) Applicant: International Business Machines Corporation, Armonk, NY (US)

(72) Inventors: Jacob Ryan Jepperson, Rochester, MN (US); Zachary A. Silverstein, Georgetown, TX (US); Spencer Thomas Reynolds, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,799

(22) Filed: Sep. 23, 2021

(51) Int. Cl.
*G06T 11/00* (2006.01)
*G06T 7/70* (2017.01)
*G06F 40/30* (2020.01)

(52) U.S. Cl.
CPC .............. *G06T 11/00* (2013.01); *G06F 40/30* (2020.01); *G06T 7/70* (2017.01)

(58) Field of Classification Search
CPC ............ G06T 11/00; G06T 7/70; G06F 40/30
See application file for complete search history.

(56) References Cited

U.S. PATENT DOCUMENTS

| | | | |
|---|---|---|---|
| 7,296,218 B2 | 11/2007 | Dittrich | |
| 8,756,571 B2 | 6/2014 | Bergman | |
| 9,280,761 B2 | 3/2016 | Sharpiro | |
| 10,057,305 B2 | 8/2018 | Woolsey | |
| 10,783,319 B2 | 9/2020 | Henderson | |
| 10,817,711 B2 | 10/2020 | Anders | |
| 10,929,458 B2 | 2/2021 | Tamir | |
| 2014/0337425 A1* | 11/2014 | Buryak | ................ H04L 67/535 709/204 |
| 2018/0039951 A1* | 2/2018 | Wynn | ................ G06Q 10/1095 |
| 2019/0087780 A1 | 3/2019 | Cerqueira | |
| 2020/0090658 A1* | 3/2020 | Shin | ....................... G06N 3/084 |
| 2021/0076105 A1 | 3/2021 | Parmar | |
| 2021/0250390 A1* | 8/2021 | Clark | .................. G06K 9/6215 |

OTHER PUBLICATIONS

"IBM Demos," IBM, accessed Sep. 21, 2021, 2 pages. <https://www.ibm.com/demos/?lc=en>.

* cited by examiner

*Primary Examiner* — Afroza Chowdhury
(74) *Attorney, Agent, or Firm* — Brian D. Welle

(57) ABSTRACT

A topic being discussed by a presenter during a presentation is determined, where the presentation relates to a software application. A software object of the software application that is associated with the topic is identified. The software object is located at a position of a screen of a user that is consuming the presentation. The software object is located at this position as a result of the software object being graphically generated on a local instance of the software application. An indication for the software object at the first position on the local screen is graphically generated.

19 Claims, 3 Drawing Sheets

OBJECT ORIENTED SCREEN OVERLAY

BACKGROUND

Modern software applications are often configured to orient various graphical objects of the software applications in different relative positions depending upon the parameters of a window that the software application is active in. For example, the software application can define various rules that control where a set of software objects will be displayed, and local instances of the software application can therein display these objects in different locations depending upon how big a window is, how much an instance of the software application is "zoomed in" or "zoomed out," what software objects the user has enabled or disabled, or the like. In many instances these rules may dramatically change the location of at least some software objects depending upon various factors.

SUMMARY

Aspects of the present disclosure relate to a method, system, and computer program product relating to providing graphical screen overlays of indications that are tracked to software objects to assist in presentations. For example, the method includes determining a topic being discussed by a presenter during a presentation relating to a software application. The method further includes identifying a software object of the software application that is associated with the topic. The method further includes locating the software object at a first position of a screen of a user that is consuming the presentation as a result of the software object being graphically generated on a local instance of the software application on the. The method further includes graphically generating an indication for the software object at the first position on the local screen. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
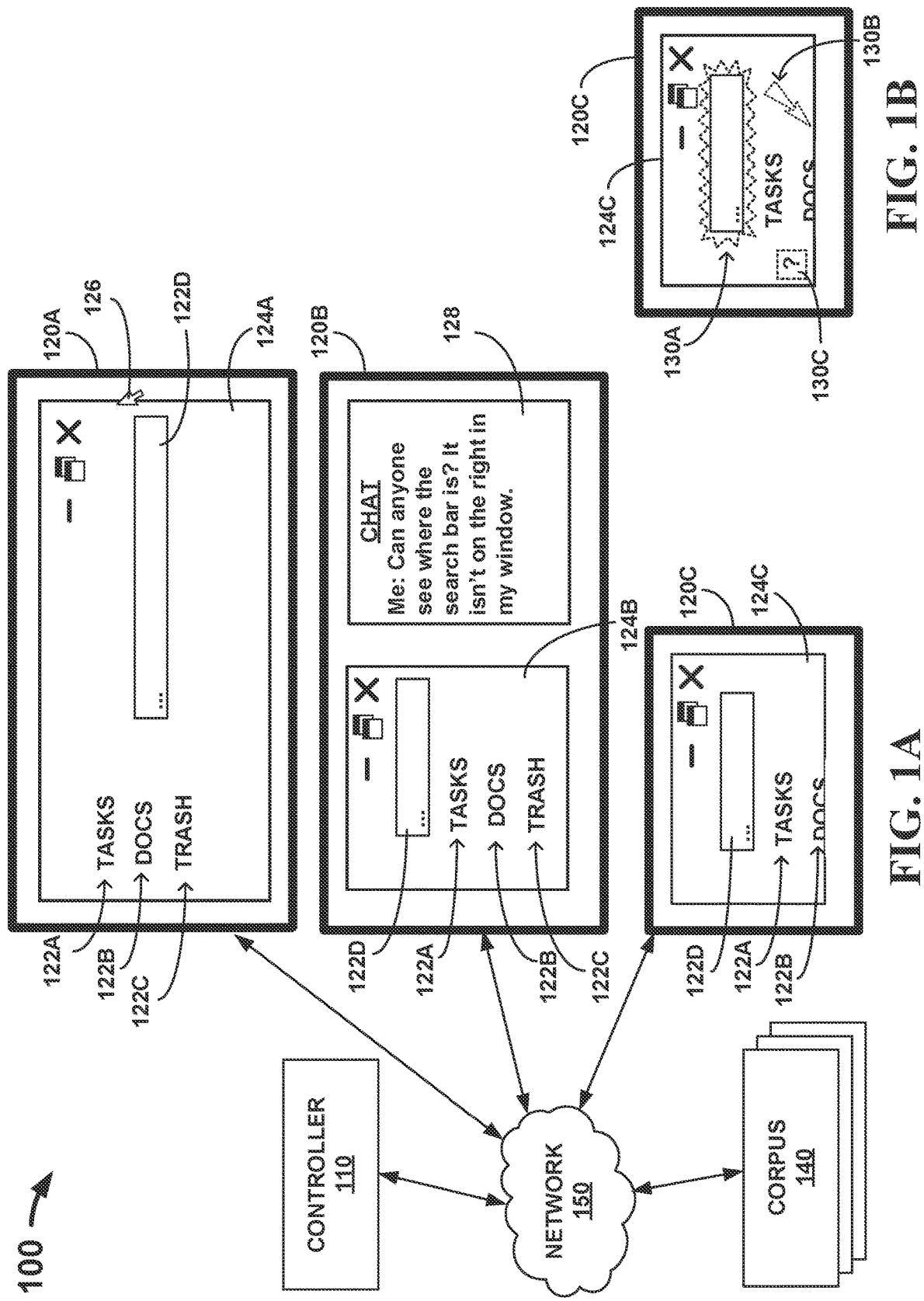
FIG. 1A depicts a conceptual diagram of an example environment in which a controller may monitor a presentation and identify software objects associated with the topics of a presentation.
FIG. 1B depicts an example of the controller of FIG. 1A graphically generating one or more indications for a software object that is associated with the presentation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to generating graphical screen overlays, while more particular aspects of the present disclosure relate to identifying a discussed software object of a presentation and graphically generating indications relating to these software object on a local screen of a user during the presentation. While the present disclosure is not necessarily limited to such applications, various aspects of the disclosure may be appreciated through a discussion of various examples using this context.

In modern organizational settings it is increasingly common for numerous people to listen to presentations while following along with the presentation on personal computing devices. This may include situations where a presenter may be discussing something that can be viewed/understood via software, where the users are accessing that software to follow along and better understand. For example, a presentation may regard a business project, and the software application may be a software application that is used to track and/or manage that business project. This may also include situations where a presenter may be discussing software itself, such as giving a tutorial on how to use the software, and the users are attempting to replicate the operations of the presenter.

In these situations, it may be advantageous for the users to be able to quickly navigate within the software application to follow the presentation. If a user is unfamiliar with the software application, it may be difficult to follow along with the words of the presenter while navigating around the software application to best consume the presentation. Once a user has lost a "thread" of a presentation, it may be difficult for that user to again capture that thread (e.g., such that it may be difficult for the user to find their spot in the software and/or understand the presentation at the same time in an optimal manner).

Some conventional systems may attempt to solve this by enabling a presenter to share their screen, such that a user that is consuming the presenter can theoretically follow along with the presenter. By sharing a screen, the conventional system may improve the ability of a user following the presentation to see how the presenter is using relevant software on the presenter's own computer, such that the user may be able to follow on a local version of the software. In some instances, a conventional system may highlight or otherwise accentuate a presenter's actions on the software on the shared screen (e.g., highlight a location of a presenter's cursor on a shared screen), to further assist a user in identifying and replicating (or otherwise learning from) the actions of the presenter.

However, software applications are often configured to optimize a presentation of software in manners that change a visual display of the software, such that where a given feature of software is graphically generated on the presenter's screen may be different than where it is graphically generated on a local screen of a user. For example, a user may identify that a presenter is accessing a lookup feature on a top right of the presenter's shared screen, but the user may be unable to locate the lookup feature on the top right of the user's local instance of the software (e.g., as a result of their local computer graphically generating this lookup feature on the top left of their screen).

Aspects of this disclosure may solve or otherwise address some or all of these problems. For example, aspects of this disclosure relate to identifying a software object that relates to an ongoing presentation, locating where the software object is located on a local screen of a user, and graphically generating an indication for this software object. A computing device that includes a processing unit executing instructions stored on a memory may provide the functionality that addresses these problems, this computing device herein referred to as a controller. The controller may do some or all of these operations in real-time during the presentation. For example, the controller may provide an indication for a software object within, e.g., 1, 2, or 5 milliseconds of a presenter saying or displaying words that relate to this software object (such that the controller does each of: identifying that the software object relates to the words, locating the software object on a local screen of a user, and graphically generating the indication within those 1, 2, or 5 milliseconds).

This controller may use natural language processing (NLP) techniques or the like to analyze the content of the words being discussed by the presenter. Once the controller identifies a topic being discussed by the presenter, the controller may analyze various factors that indicate that subject matter of the presentation (e.g., whether spoken words, displayed textual words, symbols, or the like) relates to one or more software objects, and/or identify how this topic relates to the user. For example, in some situations the controller may determine that the presentation relates to learning how to use software, such that all discussed software objects warrant indications for each of the listening users that are novices in the software (even as only the more advanced software objects warrant indications for the listening users that have intermediate proficiency in the software). In other examples, the controller may analyze what the software object does in comparison with various factors of each user, and determine whether or not any factors of the user are associated with the software object. For example, if a user struggles with certain types of functionality that are related to what the software object does, the controller may determine that the software object is associated with the user in a manner that warrants an indication. For another example, if a user has a work project that is related to software functionality that overlaps with the software object functionality, the controller may determine that the software object is associated with the user in a way that warrants an indication.

In some examples, the controller may provide graphical indications immediately upon the software object being discussed in the presentation and the controller determining that the software object is associated with the discussed topic and/or the user as discussed above. In other example, the controller may identify a sequence in which software objects are referenced within a presentation, where it is necessary and/or advantageous to first interact with a first software object, then a second software object, then a third software object, then a fourth software object, etc., in order to replicate actions of the presentation. In such a situation, the controller may only generate an indication for the second software object once the user has successfully interacted with the first software object, and then the controller may generate an indication for the third software object once the user has successfully interacted with the second software object, etc. In this way, the controller may either instantaneously provide indications or provide time-delayed indications depending upon the situation.

The controller may gather and or receive information related to the users via one or more repositories of information, and may therein provide indications as a graphical overlay that provides more or less detail for each user depending upon this gathered and/or received information. For example, say that a controller detects that a user is particularly proficient with the software application of a presentation from this gathered or received data. In such an example, the controller may provide minimal indications to this user throughout the presentation, and/or the controller may only provide indications when it appears that the user is getting confused or behind (e.g., as a result of the user lagging behind a sequence of events), and then the controller may only provide such indications as are required to get the user back up to speed. For another example, say that the controller detects that a user is particularly new to a software application. In such an example, the controller may provide a particularly robust set of indications to provide a full graphical overlay throughout the presentation, such as pseudo-constantly providing positive or negative feedback based on how the user is navigating the software and providing information on functionality of the software. The controller may scale up or scale down how robust or sparse this indication overlay is on a very granular spectrum, such that the controller may provide more or less indications on some or all types of software objects for some or all discussed topics of a presentation depending on myriad factors relating to users as discussed herein.

Figure 2:
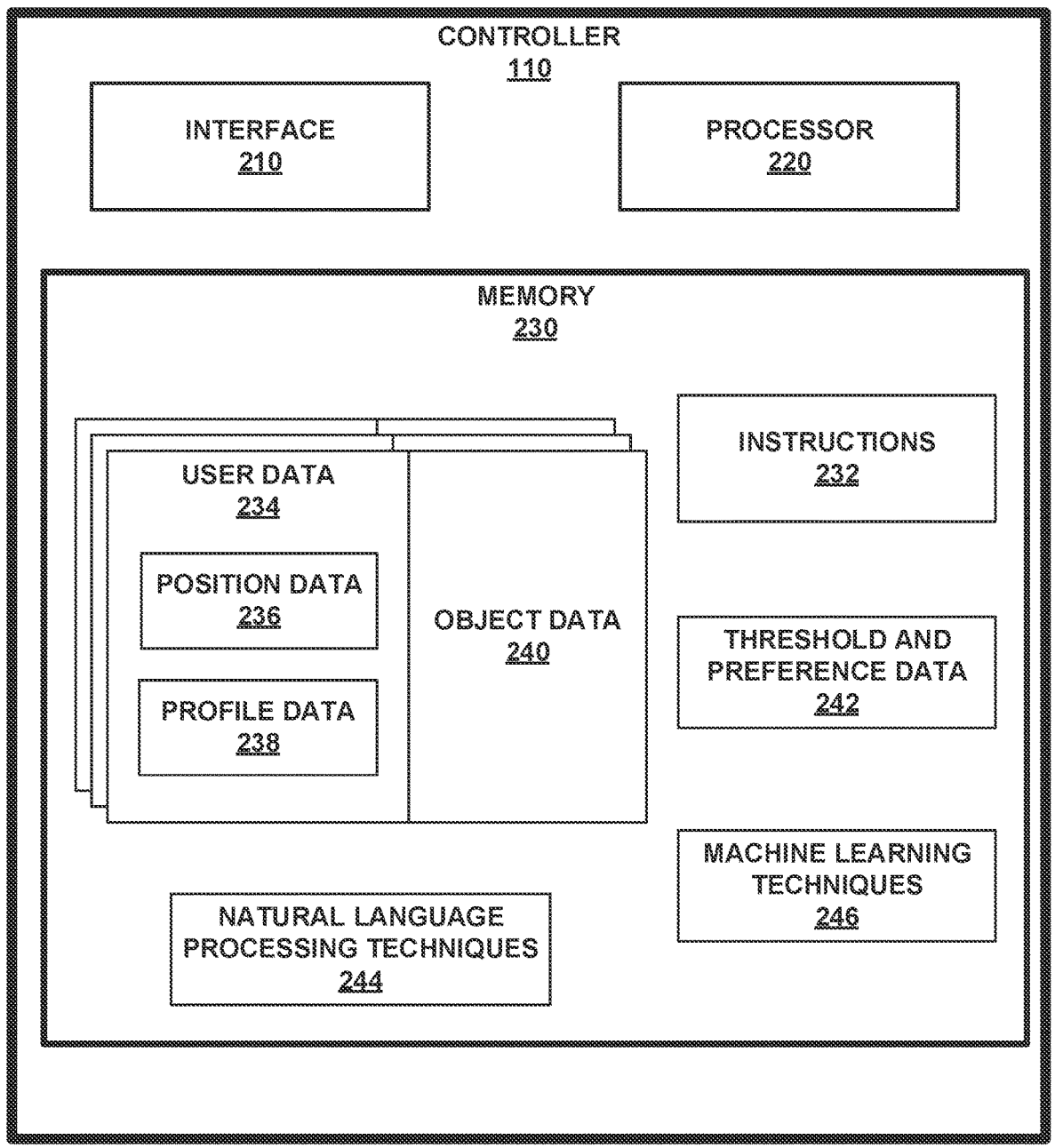
FIG. 2 depicts a conceptual box diagram of example components of the controller of FIG. 1A.

For example, FIG. 1A depicts environment 100 in which controller 110 manages providing indications (e.g., such as indications 130A-130C of FIG. 1B, hereinafter referred to collectively as "indications 130") via tracking software objects 122A-122D (collectively "software objects 122") during presentations as discussed herein. Controller 110 may include a processor coupled to a memory (as depicted in FIG. 2) that stores instructions that cause controller 110 to execute the operations discussed herein. Controller 110 may manage a presentation as initially given via one computer screen 120A and then consumed on other screens 120B, 120C (collectively, "screens 120"). For example, controller 110 may manage a presentation in part by analyzing a software application that is on one, some, or all of screens 120 during presentation.

Though only two screens 120B, 120C (and therein two users) are discussed as following the presentation for purposes of clarity, it is to be discussed that in other instances more or less users may be following the presentation when controller 110 is managing indications 130. For example, the presentation could be a live presentation that is being consumed (e.g., watched, listened to, or otherwise followed) by scores or hundreds of users at that moment (e.g., where controller 110 is managing indications 130 for each of these users). For another example, the presentation could be a taped presentation, such that at the moment in time when presentation is being consumed by a user there is only one user consuming the presentation (e.g., such that controller 110 is only managing providing indications 130 for this one user).

Screens 120 may include standalone computer screens or computer displays, such that what is graphically generated on screens 120 is the result of, e.g., a graphical processing unit (GPU) on a separate computing device that is communicatively coupled to screens 120. Alternatively, screens 120 may be integral to a computing system such as a laptop, tablet, mobile device, or the like, such that the processing units managing/generating what is generated on screens 120 is within a physical device that is permanently affixed to screens 120.

Controller 110 may track the subject matter of the presentation. This includes controller 110 listening to the spoken words of a presenter or participant, and/or controller 110 identifying the written words of a presentation (e.g., a presentation via a slideshow or the like). For example, controller 110 may use NLP techniques as discussed herein to detect and identify spoken or written words of the presentation (including an interrelation between spoken and written words of the presentation) to determine topics of the presentation.

Beyond this, controller 110 may also track the subject matter of the presentation by following the actions of a presenter on screen 120A of a presenter. For example, controller 110 may receive an opt-in from a presenter and/or one or more users listening to presentation, in response to which controller 110 may gather information on how the presenter and/or other participants are interacting with their computers and/or each other. This may include identifying how users interact with software objects 122 within respective windows 122A-122C (collectively referred to as "windows 124") within respective screens 120. As used herein, software objects 122 include objects with which a user can interact in order to operate the underlying software application, such as by entering information into a field of the respective software objects 122, clicking on the respective software objects 122, or the like. For example, controller 110 may track how users interact with various software objects 122 via respective cursors 126. For another example, controller 110 may track how users discuss various software objects within chat window 128 or the like.

Controller 110 may cause a personalized screen overlay with various indications 130 that can be unique for each user, where these indications 130 are provided based on the background of each user and/or the actions of each user in relation to the presentation. For example, at the start of a presentation, controller 110 may gather data on the presentation, on the users, and/or on software applications related to the presentation. Controller 110 may gather all of this data from and/or into one or more corpora 140. For example, at the start of a presentation controller 110 may identify a software application that is related to the presentation and may therein crawl through the software application to identify some or all software objects 122 of the software application. Controller 110 may further identify and gather within corpus 140 job titles of users, a proficiency (e.g., a proficiency with the respective software application) of respective users, various projects that users are on, various "software tickets" that users are associated with, various dictionaries associated with the presentation and/or software application, and the like.

Controller 110 may identify correlations and associations within corpus 140. Specifically, controller 110 may identify correlations and/or associations between given software objects 122 and respective users. For example, controller 110 may determine that certain software objects 122 are ones which respective users use frequently or infrequently, or are otherwise proficient or not proficient on. In some examples, controller 110 may determine that a user is proficient or not proficient as a result of the user asking a question (e.g., a spoken question during a presentation, or a written question such as depicted in chat window 128). For another example, controller 110 may determine that some users are assigned to tasks or projects that relate to some software objects 122 (e.g., a situation where a user is a project manager assigned to a software ticket that relates to an error for an intelligent search software object 122D). Controller 110 may identify some associations/correlations prior to a presentation, and may identify other associations/correlations during a presentation (e.g., such that in some instance controller 110 may identify an association between a user and respective software objects 122 only in response to the respective software objects 122 being discussed during a presentation).

Controller 110 may detect that a presentation is starting. The presentation may be live or recorded. Controller 110 may detect that the presentation relates to a software application. For example, controller 110 may detect that the presentation relates to the software application as an NLP analysis reveals that the presentation relates to teaching users how to use the software application. In other examples, controller 110 may detect that the presentation relates to the software application as a result of the presenter navigating through the software application on their screen 120A as users also navigate through local instances of the software application on their screens 120B, 120C.

As would be understood by one of ordinary skill in the art, software applications may be graphically generated to look different based on the settings of different local instances of the software application and/or based on different physical screens. For example, as depicted in FIG. 1A, window 124A of a local instance of the software application is maximized within screen 120A of the presenter, such that tasks software object 122A is on a top left of window 124A, docs software object 122B is on a middle left of window 124A, trash software object 122C is on a bottom left of window 124A, and intelligent search 122D is in a middle right of window 124A. However, despite screen 120B being the same size as screen 120A, window 124B of the same software application is not maximized within screen 120B (e.g., as a result of chat window 128), such that left intelligent search 122D software object is on the top left of window 124B (rather than being on the middle as in screen 120A), among other changes. Similarly, even though window 124C is maximized within screen 120C, as a result of screen 120C being a smaller size than screen 120A software object 120C is not graphically generated on the screen, among other changes.

Controller 110 detects that a topic being discussed by a presentation relates to one or more software objects 122. As discussed, controller 110 may detect that a presentation relates to one or more software objects 122 as a result of the written or spoken content of the presentation relating to the respective software objects 122. In other examples, controller 110 may detect that a presentation relates to one or more software objects 122 as a result of the presenter executing an action using the one or more software objects 122, or a threshold of the users consuming the presentation executing the action (e.g., such that once 75% of users execute an action via software object 122A at a first point in time during a presentation, controller 110 may provide indications 130 for the remaining 25% of users to execute the action via software object 122A). Once controller 110 detects that the presentation relates to one or more software objects 122, controller 110 may locate a relative position where the one or more software objects are located in the local instances of the software application within respective windows 124 of respective screens 120. Controller 110 may then graphically generate one or more indications 130 for the software object 122 based on various factors as discussed herein.

These indications 130 may be configured to enable a user to find respective software objects 122. For example, in a situation where most users have typed something into intelligent search software object 122D but a user using screen 120C has not typed anything into intelligent search 122D for some period of time (e.g., within three seconds), controller 110 may provide indication 130A which graphically brings attention to intelligent search software object 122D.

For another example, if controller 110 detects that a user has a low proficiency with this software application, controller 110 may provide indication 130B for trash software object 122C as soon as trash software object 122C is discussed in presentation (e.g., such that controller 110 may not wait some period of time before providing indication 130B). Controller 110 may identify that trash software object 122C is not currently visible within window 124C, and controller 110 may therefore provide an indication 130B that directs the user to take an action that would enable trash software object 122C to be visible. For example, where trash software object 122C is outside a current window 124C displayed on screen 120C, controller 110 generates indication 130B of an arrow pointing down to indicate that the user should scroll down to navigate to trash software object 122. Alternatively, if a user had previously "deleted" this software object 122C from this view, controller 110 may provide one or more indications 130 that would enable a user to repopulate this software object 122C within window 124C so that it may be used.

For another example, if controller 110 detects that a user has a project that is associated with tasks software object 122A, controller 110 may cause an informational indication 130C to be graphically generated as soon as the tasks software object 122 is discussed within the presentation. Controller 110 may configure informational indication 130C such that a user may hover over informational indication 130C and be reminded about these projects, so that the user may ask questions or otherwise be aware of these projects to make the presentation more fruitful as is applicable.

Controller 110 may be configured to keep track of a sequence in which software objects 122 are discussed within the presentation. Controller 110 may then provide indications 130 according to this sequence, delaying indications 130 until a user has executed each step in the sequence. For example, controller 110 may detect that there is a sequence wherein a user has to first click on an "file" tab software object, then open a "settings" software object that is made visible as a result of clicking on that file tab, and then change a few parameters within different software objects that are visible once the user opens the settings page. In this example, controller 110 may identify this sequence and provide indications in an order that corresponds with what the user has done. For example, controller 110 may provide indication(s) 130 configured to get the user to click on the settings software object 122 only in response to the user clicking on the file software object 122, and may then provide indication(s) 130 configured to get the user to change the parameters only in response to the user clicking on the settings software object 122.

In some examples, controller 110 may delay the presentation itself when a user is getting behind within a sequence. For example, where a presentation is taped (e.g., not live), controller 110 may reduce a speed of (e.g., change from 1× speed to 0.75× speed) of the presentation in response to a user getting behind within a sequence. In other examples, controller 110 may pause the presentation until the user is "caught up" with the sequence of the presentation. In other examples where the presentation is live, controller 110 may generate and deliver a notification to a presenter that one or more users is behind the sequence, enabling a presenter to pause and/or delay moving to a next step in the sequence as appropriate until users are caught up.

Indications 130 may include any variety of graphical display that is consistent with this disclosure. For example, indications 130 may include changing a color of software objects 122 of software application within window 130, circling or surrounding software objects 122, or the like. Indications 130 may be configured to allow full functionality and visibility of the local instance of the software application, such that indications 130 may be see-through and/or primarily/exclusively graphical in nature (e.g., graphical rather than changing any functionality of the software application). While example indications 130 are depicted in FIG. 1B for purposes of illustration, any indications 130 consistent with this disclosure are considered and contemplated herein.

Controller 110 may interact with screens 120 and corpus 140 via network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., computing devices include that are coupled to screens 120 or are integral with screens 120, computing devices that host corpus 140, or the like) may receive messages and/or instructions from and/or through network 150 and forward the messages and/or instructions for storage or execution or the like to a respective memory or processor of the respective computing/processing device. Though network 150 is depicted as a single entity in FIG. 1A for purposes of illustration, in other examples network 150 may include a plurality of private and/or public networks.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with screens 120 and/or corpus 140. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to monitor presentations and provide indications by tracking software object usage. Controller 110 may utilize processor 220 to manage presentations in this way. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to monitor presentations and provide indications accordingly.

Processor 220 may manage presentations according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage presentations as described herein according to instructions 232 of one or more applications (e.g., software applications) stored in memory 230 of controller 110.

In addition to instructions 232, in some examples gathered or predetermined data or techniques or the like as used by processor 220 to manage presentations as described herein may be stored within memory 230. For example, memory 230 may include information described above that is gathered from one or more corpora 140. Specifically, as depicted in FIG. 2, memory 230 may include user data 234 and object data 240.

User data 240 may include data that is unique to each user. For example, user data 240 may include position data 236 and profile data 238. Position data 236 may include information such as where software objects 122 are positioned in windows 124 of respective screens 120 of users. As would be understood by one or ordinary skill in the art, position data 236 may be dynamically updated as users change a size of window 124, zoom in or zoom out within window 124, navigate through a software application, or the like. Profile data 238 may include data on a proficiency of users, titles of users, projects of users, or the like.

As depicted within FIG. 2, user data 234 may be correlated to object data 240. Object data 240 may include a list of software objects 122 that are being discussed within presentation as detected by controller 110. Object data 240 may further include general information on each of software objects 122, such as a functionality of respective software objects 122. Controller 110 may determine a functionality of respective software objects by consulting documentation associated with the software application, and/or by monitoring how other users are discussing/using the software object. Using object data 240 that is correlated to user data 234, controller 110 may determine a unique set of indications that are relevant for each user based on associations and correlations between object data 240 and profile data 238, and when these associations/correlations are high enough controller 110 will graphically generate indications at respective positions as stored within position data 236.

Further, memory 230 may include threshold and preference data 242. Threshold and preference data 242 may include thresholds that define a manner in which controller 110 is to manage presentations and provide indications. For example, threshold and preference data 242 may include time or participation thresholds at which controller 110 is to provide indications (e.g., such that controller 110 provides indications 130 after a user falls behind software object 122 actions by one second, two seconds, or three seconds, and/or controller 110 provides indications 130 once 50%, 75% or 90% of users have executed an software object 122 action that a user has not executed). In other examples, threshold and preference data 242 may include preferences as to what kind of indications that a user prefers to receive, such as a blinking exclamation point vs. a bold red circle vs. highlighted portion software object.

Memory 230 may further include natural language processing (NLP) techniques 244. NLP techniques 244 can include, but are not limited to, semantic similarity, syntactic analysis, and ontological matching. For example, in some embodiments, processor 220 may be configured to analyze natural language data of data exhaust or the like as gathered during presentation to determine semantic features (e.g., word meanings, repeated words, keywords, etc.) and/or syntactic features (e.g., word structure, location of semantic features in headings, title, etc.) of the spoken or written natural language data being provided by the presenter and/or by one or more users. Ontological matching could be used to map semantic and/or syntactic features to a particular concept or topic. The topic can then be used to identify a software object that is related to the topic, after which an indication can be provided for the software object as described herein.

Memory 230 may further include machine learning techniques 246 that controller 110 may use to improve a process of providing indications related to software objects 122 as described herein over time. Machine learning techniques 246 can comprise algorithms or models that are generated by performing supervised, unsupervised, or semi-supervised training on a dataset, and subsequently applying the generated algorithm or model to provide indications relating to software objects 122. Using these machine learning techniques 246, controller 110 may improve an ability of determining which software objects 122 are related to a discussed topic of a presentation, and/or providing indications 130 that better assist a user in acting upon respective software objects 122 and therefore assist in the consumption of the presentation. For example, controller 110 may identify whether certain types of indications 130 are better or worse at getting users to quickly "catch up" when behind in a sequence. For another example, controller 110 may learn over time which software objects 122 are "correct" based on communal usage (e.g., where it is assumed that the usage of software objects 122 by the majority of users is the correct usage), such that controller may provide positive or negative indications 130 (e.g., a negative indication 130 being "no not that button" when a user is hovering a cursor over a first software object button that a user is determined to be the "incorrect" software object, and a positive indication 130 "yes the one on the right" when a user is hovering a cursor over a second software object button that is determined to be "correct").

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, i-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
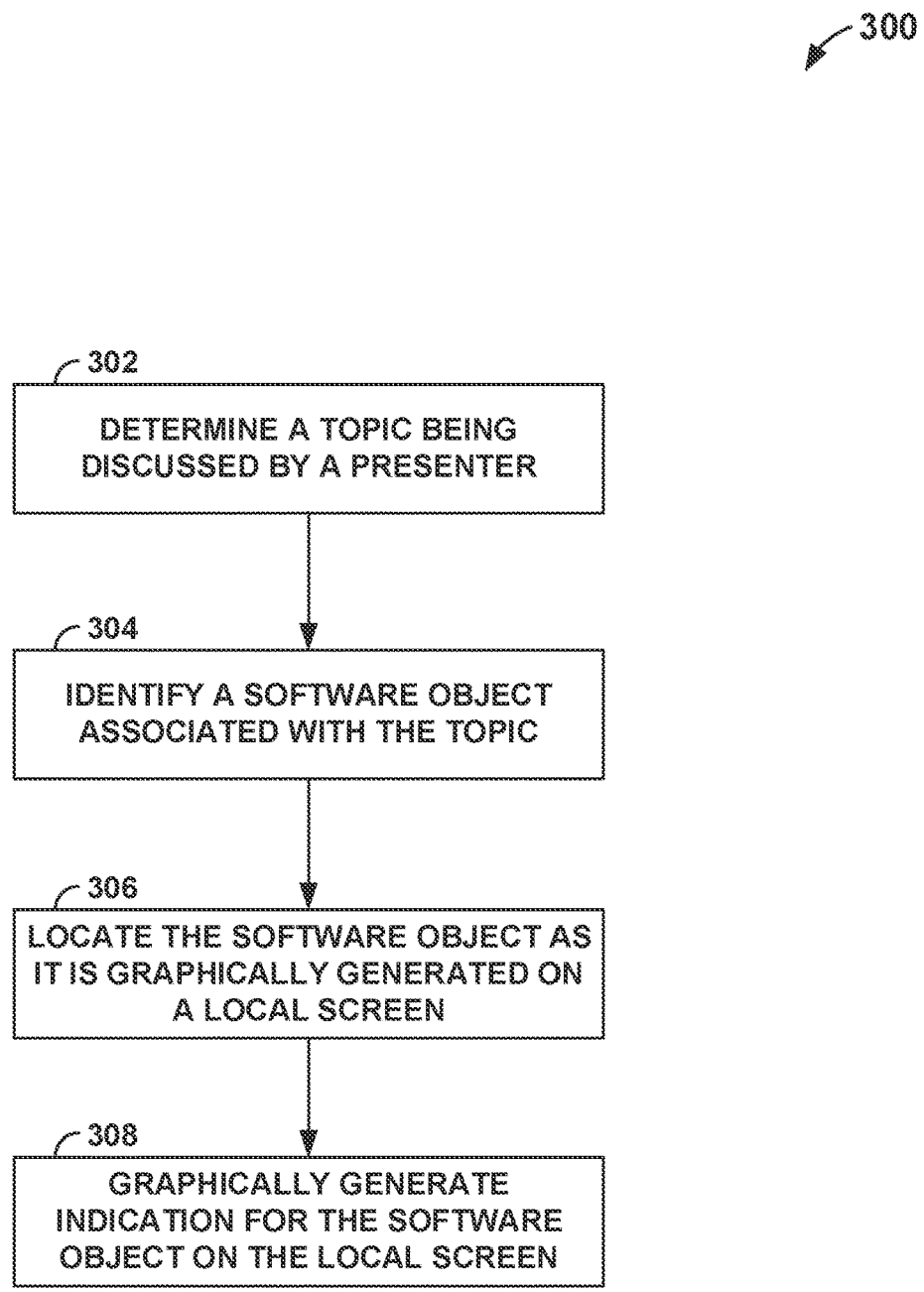
FIG. 3 depicts an example flowchart by which the controller of FIG. 1A may manage presentations by graphically generating indications for software objects associated with presentations.

Using these components, controller 110 may manage providing indications 130 related to discussed software objects 122 as discussed herein. For example, controller 110 may provide indications 130 according to flowchart 300 depicted in FIG. 3. Flowchart 300 of FIG. 3 is discussed with relation to FIGS. 1A and 1B for purposes of illustration, though it is to be understood that other environments with other components may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 determines a topic being discussed by a presenter (302). Controller 110 may use speech-to-text techniques and/or text processing to capture the content of the presentation. Once captured, controller 110 analyzes the subject matter to determine what is being discussed/presented.

Controller 110 identifies one or more software objects 122 associated with the discussed topic (304). Controller 110 may use corpus 140 to identify software objects 122 associated with the discussed topic. Corpus 140 may be manually populated by users providing information and/or automatically populated by controller 110 gathering data relating to users and/or software objects 122 as discussed herein. In some cases, corpus 140 is a structured corpus, such that a trained data scientist has structured data within corpus 140 to highlight relevant associations and correlations between users, presentation topics, and/or software objects 122.

Controller 110 locates respective software objects 122 associated with the discussed topic on local screens 120 of users (306). Controller 110 graphically generates one or more indications for respective located software objects 122 at the identified positions of software objects 122 on local screens 120 (308). In some examples, controller 110 may provide a series of updating indications in real time throughout a presentation, where a robustness of such an indications 130 overlay corresponds to detected proficiencies/preferences/projects of respective users. Controller 110 may personalize such an indications 130 overlay for each user. In some examples, even if two users have identical proficiencies, preferences, and projects (e.g., such that the information within indications 130 might be identical for the two users), the actual presentation of the indications 130 overlay may look different based on different locations of software objects 122 on respective screens 120 of the two users.

Controller 110 may substantially personalize the indications 130 overlay to improve an ability to provide data to a user. For example, controller 110 may determine that a user is not particularly proficient in one software application, and so in response to detecting a presentation that relates to this one software application controller 110 may therein provide a robust and pseudo-constant stream of indications 130 (e.g., such that controller 110 is providing at least one indication during 95% of the presentation, and is providing multiple indications during 75% of the presentation). Such a robust pseudo-constant stream of indications 130 may include consistently guiding a user between different software objects 122, "crossing out" software objects 122 to be ignored in a given step, "highlighting" software objects 122 to be navigated to, etc. Controller 110 may further provide descriptive pop-ups to be presented in response to a user hovering over given software objects 122 if a user is not proficient, so that the user may understand what the respective software objects 122 do before the user acts on them. Further, controller 110 may determine the specific portions of a software application that a user is proficient on, and provide such indications 130 only for software objects 122 that correspond to portions of the software application for which the user is not particularly proficient.

In this way, a robustness of the indications 130 overlay may be scaled up or down during a presentation in response to a detected proficiency of a user. In some examples, this robustness may dynamically scale up or down in response to a user understanding or not understanding the presentation. For example, controller 110 may scale up an indications 130 overlay in response to a user "falling behind," or asking many questions (directly, or in a chat), or the user starting to consistently act using incorrect actions upon incorrect software objects 122, or the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
determining a topic being discussed by a presenter during a presentation relating to a software application;
identifying a software object of the software application that is associated with the topic by identifying the software object as being interacted with by the presenter on a computer of the presenter as viewed by an audience;
locating the software object at a first position of a screen of a user that is consuming the presentation as a result of the software object being graphically generated on a local instance of the software application; and graphically generating an indication for the software object at the first position on a local screen in real time.

2. The computer-implemented method of claim 1, wherein the identifying the software object that is associated with the topic includes using natural language processing techniques to map natural language content of the presentation to respective software objects.

3. The computer-implemented method of claim 1, wherein the identifying the software object as being interacted with by the presenter on a computer of the presenter by tracking a cursor of the presenter.

4. The computer-implemented method of claim 1, wherein the local screen is a first screen and the user is a first user, further comprising:
    locating the software object at a second position as graphically generated on a second screen of a second user that is consuming the presentation; and
    graphically indicating the software object at the second position on the second screen.

5. The computer-implemented method of claim 4, wherein the first position is different than the second position because the local screen is sized differently than the second screen.

6. The computer-implemented method of claim 4, wherein the first position is different than the second position because a first software window of the software object on the first screen is a different size than a second software window of the software object on the second screen.

7. The computer-implemented method of claim 1 wherein the software object is a first software object, the method further comprising:
    identifying a sequence of software objects to graphically generate that includes a second software object and a third software object;
    graphically generating a second indication for the second software object in response to detecting that the user has engaged the first software object according to the sequence; and
    graphically generating a third indication for the third software object in response to detecting that the user has engaged the second software object according to the sequence.

8. The computer-implemented method of claim 7, wherein the indication for the first software object is provided in real time and the second indication is delayed until the user has engaged the first software object.

9. The computer-implemented method of claim 1, further comprising:
    identifying a plurality of projects associated with the user; and
    determining that at least one project of the plurality of projects relates to the software object,
    wherein the indication identifies the at least one project and is graphically generated in response to determining that the software object relates to the at least one project.

10. The computer-implemented method of claim 1, further comprising:
    identifying a proficiency of the user in relation to the software application; and
    determining that the proficiency of the user is below a threshold as it relates to the software object,
    wherein the indication is graphically generated in response to determining that the proficiency of the user is below the threshold.

11. A system comprising:
    a processor; and
    a memory in communication with the processor, the memory containing instructions that, when executed by the processor, cause the processor to:
        determine a topic being discussed by a presenter during a presentation relating to a software application;
        identify a software object of the software application that is associated with the topic;
        locate the software object at a first position of a screen of a user that is consuming the presentation as a result of the software object being graphically generated on a local instance of the software application;
        identify a proficiency of the user in relation to the software application; and
        determine that the proficiency of the user is below a threshold as it relates to the software object; and
        graphically generate an indication for the software object at the first position on a local screen in response to determining that the proficiency of the user is below the threshold.

12. The system of claim 11, wherein the identifying the software object that is associated with the topic includes using natural language processing techniques to map natural language content of the presentation to respective software objects.

13. The system of claim 11, wherein the identifying the software object that is associated with the topic includes identifying the software object as being interacted with by the presenter on a computer of the presenter.

14. The system of claim 11, wherein the local screen is a first screen and the user is a first user, the memory containing additional instructions that, when executed by the processor, cause the processor to:
    locate the software object at a second position as graphically generated on a second screen of a second user that is consuming the presentation; and
    graphically indicate the software object at the second position on the second screen.

15. The system of claim 11 wherein the software object is a first software object, the memory containing additional instructions that, when executed by the processor, cause the processor to:
    identify a sequence of software objects that includes a second software object and a third software object that are both associated with the topic;
    graphically generate a second indication for the second software object in response to detecting that the user has engaged the first software object according to the sequence; and
    graphically generate a third indication for the third software object in response to detecting that the user has engaged the second software object according to the sequence.

16. The system of claim 15, wherein the indication for the first software object is provided in real time and the second indication is delayed until the user has engaged the first software object.

17. The system of claim 11, the memory containing additional instructions that, when executed by the processor, cause the processor to:
    identifying a plurality of projects associated with the user; and
    determining that at least one project of the plurality of projects relates to the software object, wherein the indication identifies the at least one project and is graphically generated in response to determining that the software object relates to the at least one project.

18. A computer program product, the computer program product comprising a computer readable storage medium having program instructions embodied therewith, the program instructions executable by a computer to cause the computer to:

determine a topic being discussed by a presenter during a presentation relating to a software application;

identify a software object of the software application that is associated with the topic; locate the software object at a first position of a screen of a user that is consuming the presentation as a result of the software object being graphically generated on a local instance of the software application;

graphically generate a first indication for the software object at the first position on a local screen;

identify a sequence of software objects to graphically generate that includes a second software object and a third software object;

graphically generate a second indication for the second software object in response to detecting that the user has engaged the first software object according to the sequence; and graphically generate a third indication for the third software object in response to detecting that the user has engaged the second software object according to the sequence.

19. The computer program product of claim 18, wherein the identifying the software object that is associated with the topic includes using natural language processing techniques to map natural language content of the presentation to respective software objects.

* * * * *